United States Patent
Na (10) Patent No.: US 8,223,765 B2
(45) Date of Patent: Jul. 17, 2012

(54) METHOD AND SYSTEM FOR PROCESSING MULTICAST IN UNICAST-BASED VOIP SYSTEM

(75) Inventor: Jeong-Hwan Na, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1383 days.

(21) Appl. No.: 11/882,713

(22) Filed: Aug. 3, 2007

(65) Prior Publication Data

US 2008/0072041 A1 Mar. 20, 2008

(30) Foreign Application Priority Data

Sep. 20, 2006 (KR) .......................... 10-2006-0091372

(51) Int. Cl.
*H04L 12/28* (2006.01)
*H04L 12/66* (2006.01)
*H04L 12/16* (2006.01)
*H04L 29/06* (2006.01)
*H04J 3/26* (2006.01)

(52) U.S. Cl. ........ 370/390; 370/392; 370/432; 370/260; 370/352; 713/163

(58) Field of Classification Search .................. None
See application file for complete search history.

(56) References Cited

U.S. PATENT DOCUMENTS

| 6,181,697 | B1  |   | 1/2001  | Nurenberg et al. |         |
|-----------|-----|---|---------|------------------|---------|
| 6,192,417 | B1  | * | 2/2001  | Block et al.     | 709/249 |
| 7,325,072 | B2  | * | 1/2008  | Chen et al.      | 709/238 |
| 7,693,132 | B1  | * | 4/2010  | Cooper et al.    | 370/352 |
| 7,715,390 | B2  | * | 5/2010  | Suzuki           | 370/390 |
| 7,944,925 | B2  | * | 5/2011  | Meier et al.     | 370/395.1 |
| 2002/0143951 | A1 |  | 10/2002 | Khan et al.     |         |
| 2003/0081559 | A1 | * | 5/2003  | Matuoka et al.  | 370/252 |
| 2004/0223464 | A1 |  | 11/2004 | Dye et al.      |         |
| 2005/0180448 | A1 | * | 8/2005  | Kobayashi       | 370/432 |

(Continued)

FOREIGN PATENT DOCUMENTS

KR 2000-0036891 7/2000

(Continued)

OTHER PUBLICATIONS

European Search Report issued on Jan. 7, 2008, corresponding to European Patent Application No. 07017214.3.

(Continued)

*Primary Examiner* — Gary Mui
*Assistant Examiner* — Hicham Foud
(74) *Attorney, Agent, or Firm* — H.C. Park & Associates, PLC (57) ABSTRACT

Exemplary embodiments of the invention provide a system and method for providing multicast service in a unicast-based Voice over Internet Protocol (VoIP) system. The system and method include a VoIP call server receiving subnet information from VoIP terminals authenticated by an authentication server, generating multicast group information, and providing the multicast group information to the respective authenticated VoIP terminals. The VoIP call server searches a list of grouped VoIP terminals, selects a VoIP terminal of a corresponding subnet, transmits multicast session information to the selected VoIP terminal to set the VoIP terminal as a relay VoIP terminal, and requests a media server to transmit group message data to the relay VoIP terminal. According to this system and method, it is possible to implement a multicast service in a unicast-based VoIP system without adding additional equipment.

15 Claims, 11 Drawing Sheets

U.S. PATENT DOCUMENTS

2007/0189290 A1* 8/2007 Bauer .......................... 370/390

FOREIGN PATENT DOCUMENTS

| KR | 10-2001-0105387 | 11/2001 |
|---|---|---|
| KR | 2002-0050570 | 6/2002 |
| KR | 10-2003-0046661 | 6/2003 |
| KR | 10-2003-0046978 | 6/2003 |
| KR | 10-2003-0063506 | 7/2003 |
| KR | 2003-0093592 | 12/2003 |
| KR | 2003-0093813 | 12/2003 |
| KR | 2004-0017220 | 2/2004 |
| KR | 10-2005-0010476 | 1/2005 |
| KR | 2006-0059073 | 6/2006 |
| WO | WO 02/21301 | 3/2002 |
| WO | WO 2006/085286 | 8/2006 |

OTHER PUBLICATIONS

Korean Decision of Grant issued on Jan. 25, 2008, corresponding to Korean Patent application No. 2006-91372.

Korean Office Action corresponding to Korean Patent Application No. 10-2006-0091372, issued on Sep. 27, 2007.

* cited by examiner

METHOD AND SYSTEM FOR PROCESSING MULTICAST IN UNICAST-BASED VOIP SYSTEM

CLAIM OF PRIORITY

This application makes reference to, incorporates the same herein, and claims all benefits accruing under 35 U.S.C. §119 from an application for METHOD AND SYSTEM FOR PROCESSING MULTICAST IN UNICAST-BASED VoIP SYSTEM earlier filed in the Korean Intellectual Property Office on the 20$^{th}$ of Sep. 2006 and there duly assigned Serial No. 10-2006-0091372.

BACKGROUND OF THE INVENTION

1. Technical Field

The present invention relates to a method and system for processing multicast in a unicast-based Voice over Internet Protocol (VoIP) system.

2. Description of the Related Art

In order to provide group message service through the Internet, servers mostly use a method of transmitting the same message data as many times as the number of users. The method places a load on a server and a network in proportion to the number of terminals, but is used in most environments because it is easily implemented and facilitates user management.

On the other hand, a multicast transmission scheme can efficiently use network resources without the above-mentioned repeated transmission of a group message, but it is not easy to apply.

It is best for a conventional VoIP system to use multicast for transmitting the same message data in a group of many users using the Internet.

However, all routers along a traffic path must support a multicast protocol, and transmission trees of respective sessions need to be maintained so that the conventional VoIP system can use multicast.

In addition, commonly used routers do not currently support multicast. Furthermore, the most appropriate method should be selected to construct a transmission tree in total consideration of the number, density and distribution of senders and receivers, which is not an easy task.

In other words, problems of interoperation and disagreement between Internet service providers (ISPs) inhibit the provision of multicast service.

Since it is difficult to provide a service using multicast in a conventional VoIP system, an application-layer multicast scheme has been developed as an alternative method.

The application-layer multicast scheme sets up the transmission order of terminals according to only a unicast transmission scheme of an Internet Protocol (IP) layer, and then transfers data. Thus, the load on the server can be reduced, and traffic can be distributed all over a network in which the terminals are located.

In addition, there is a scheme of converting unicast data into multicast data and relaying it. Likewise, this scheme has an advantage in traffic distribution and can improve the time taken for transferring data to a final terminal.

In the case of the latter scheme, equipment capable of separately processing multicast may be installed in each network, but this requires the installation of additional equipment.

Conventionally invented methods of transmitting a group message are mainly focused on only obtaining multicast effects, and thus do not fully take into consideration matters indispensable for providing a service, such as setup and maintenance of group information. Most methods of transmitting a group message are based on the assumption that multicast transmission scheme is used, and thus are somewhat inappropriate for providing actual service.

In addition, the conventionally invented methods are designed by considering a general data network, rather than a specialized environment such as VoIP, and thus are not easy to apply.

SUMMARY OF THE INVENTION

It is an objective of the present invention to provide a method and system for processing multicast in a unicast-based Voice over Internet Protocol (VoIP) system which efficiently multicasts group message data in an actual VoIP system.

It is another objective of the present invention to provide a method and system for processing multicast in a unicast-based VoIP system which can efficiently transmit multicast group message data in a VoIP system not supporting multicast.

A first aspect of the present invention provides a method of processing multicast in a unicast-based VoIP system, comprising the steps of: receiving, at a VoIP call server, subnet information from VoIP terminals authenticated by an authentication server, generating multicast group information, and then providing the multicast group information to the respective authenticated VoIP terminals; searching, at the VoIP call server, a list of grouped VoIP terminals, selecting a VoIP terminal of a corresponding subnet, and then transmitting multicast session information to the selected VoIP terminal so as to set the VoIP terminal as a relay VoIP terminal; and requesting, at the VoIP call server, a media server to transmit group message data to the relay VoIP terminal.

In the latter regard, the subnet information may include a subnet Internet Protocol (IP) address and netmask information. Also, the multicast group information may include IP addresses of all multicast groups including a VoIP terminal.

The multicast session information may include a multicast IP address, a data type, and group identification (ID) information.

A second aspect of the present invention provides a method of processing multicast in a unicast-based VoIP system, comprising the steps of: when authentication of a VoIP terminal is finished by an authentication server, transmitting, at the VoIP terminal, subnet information to a VoIP call server; receiving, at the VoIP terminal, multicast group information from the VoIP call server; determining, at the VoIP terminal, whether or not multicast session information is received from the VoIP call server; when it is determined, in the latter step, that the multicast session information is received, analyzing, at the VoIP terminal, the multicast session information and preparing to relay group message data; when the VoIP terminal receives group message data from a group message data server via unicast, changing, at the VoIP terminal, a unicast IP address to a corresponding multicast IP address; and transmitting, at the VoIP terminal, the group message data, the unicast IP address of which is changed to the multicast IP address, to a subnet of the VoIP terminal, and simultaneously re-receiving and processing the multicast group message data transmitted by the VoIP terminal itself using multicast.

In addition, the method may further comprise the steps of: when it is determined, in the step of determining whether or not multicast session information is received from the VoIP call server, that the multicast session information is not received, comparing, at the VoIP terminal, an IP address of the multicast group information received from the VoIP call server to a multicast IP address of multicast group message data received from a relay VoIP terminal, and determining whether the IP address is the same as the multicast IP address of the multicast group message data received from the relay VoIP terminal; and when it is determined, in the latter step, that the IP address is the same as the multicast IP address, receiving, at the VoIP terminal, multicast group message data relayed by the relay VoIP terminal.

A third aspect of the present invention provides a system for processing multicast in a unicast-based VoIP system, comprising: a VoIP call server responsive to a VoIP terminal being authenticated by an authentication server for receiving subnet information from the VoIP terminal, for updating information of a multicast group with the received subnet information, and for transmitting IP address information of the multicast group to the VoIP terminal, and responsive to a relay VoIP terminal of a subnet being selected for transmitting multicast session information to the relay VoIP terminal, and for requesting a media server to transmit group message data to the relay VoIP terminal; and a VoIP terminal which, after being authenticated by the authentication server, transmits information of a subnet to which the VoIP terminal belongs to the VoIP call server, allocates a corresponding multicast IP address to its own network interface card (NIC) when receiving corresponding multicast group information from the VoIP call server, changes a unicast IP address of unicast group message data received from the media server with a multicast IP address, and transmits the multicast group message data to the subnet when receiving multicast session information from the VoIP call server.

In the latter regard, the VoIP call server may comprise: a multicast manager for receiving the subnet information from the VoIP terminal and updating the multicast group information with the received subnet information of the VoIP terminal; a multicast information provider for transmitting the updated IP address information of the multicast group to the VoIP terminal; a relay terminal selector for selecting the relay VoIP terminal of the subnet and transmitting the multicast session information to the relay VoIP terminal; and a multicast processor for requesting the media server to transmit the group message data to the relay VoIP terminal.

In addition, the VoIP terminal may comprise: a network information provider for transmitting its own subnet information to the VoIP call server; a multicast setter for allocating the multicast IP address to its own NIC when receiving the multicast group information from the VoIP call server; a relay determiner for determining whether multicast session information is received from the VoIP call server, and thereby determining whether or not to relay the group message data; and a relay processor which, upon receiving the unicast group message data from the media server, changes the unicast IP address to the multicast IP address corresponding to the multicast session information and transmits the multicast group message data to its own subnet.

In the latter regard, the VoIP terminal may further comprise a multicast media processor which, when multicast session information is not received from the VoIP call server, determines whether the multicast group message data is received from the relay VoIP terminal, and receives only corresponding multicast group message data.

Furthermore, the subnet information may further include a subnet IP address and netmask information.

Finally, the multicast group information may include IP addresses of all multicast groups including a VoIP terminal, and the multicast session information may include a multicast IP address, a data type, and group ID information.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention will be described in detail with reference to the accompanying drawings. In the following disclosure, a detailed description of known functions and configurations incorporated herein has been omitted for conciseness. The following description is presented with regard to exemplary embodiments in which the present invention is applied to a method and system for processing multicast in a unicast-based Voice over Internet Protocol (VoIP) system. It should be noted that the following exemplary embodiments are merely presented to assist in an understanding of the present invention, and thus are not to be interpreted as limiting the scope of the present invention.

Figure 1A:
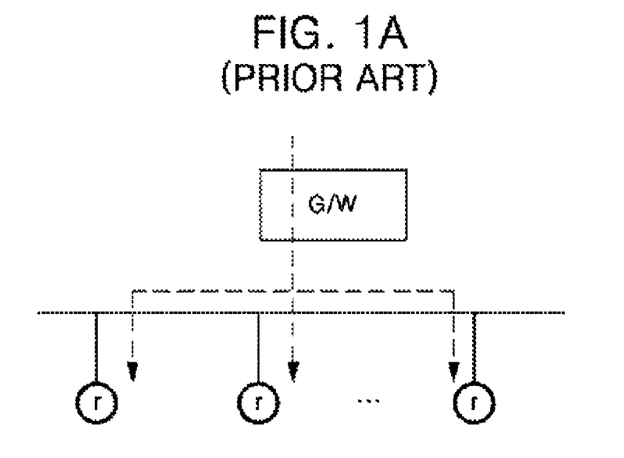
FIG. 1A illustrates a system using a multicast scheme.
Figure 1B:
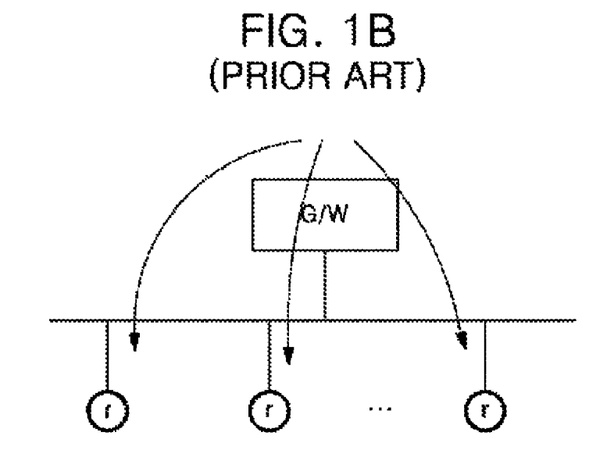
FIG. 1B illustrates a system using a unicast scheme.
Figure 1C:
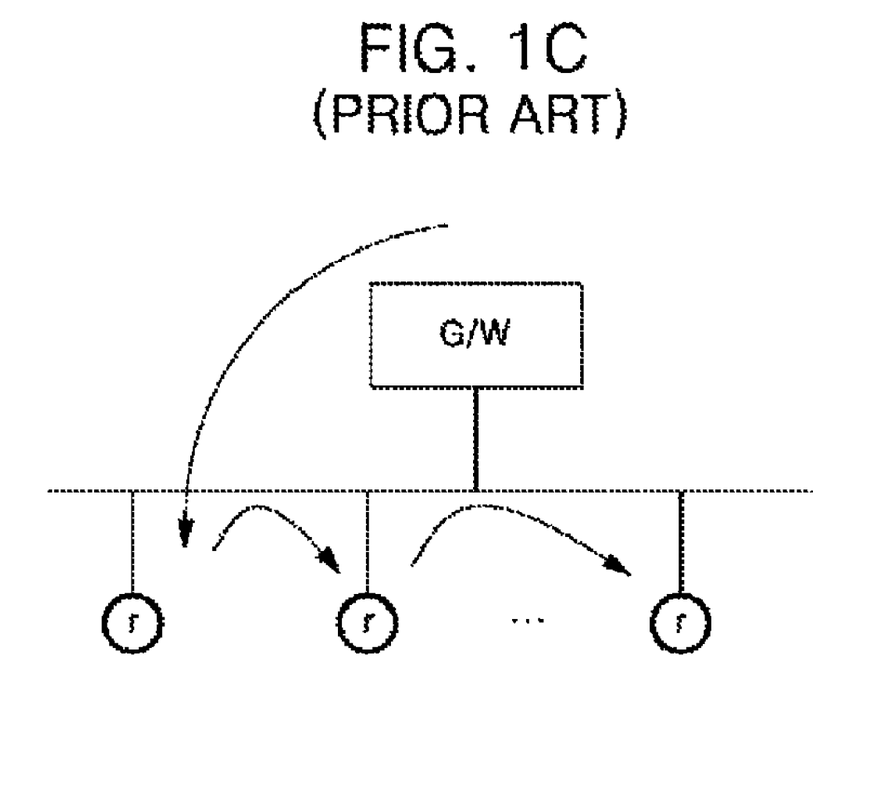
FIG. 1C illustrates a system using an application-layer multicast scheme.

FIG. 1A illustrates a system using multicast scheme, FIG. 1B illustrates a system using a unicast scheme, and FIG. 1C illustrates a system using an application-layer multicast scheme.

Referring to FIG. 1A, it is best for a VoIP system to use multicast for transmitting the same message data in a group of many users using the Internet. All routers (r) along a traffic path must support a multicast protocol, and transmission trees of respective sessions need to be maintained so that the conventional VoIP system can use multicast.

Commonly used routers do not currently support multicast. In addition, the most appropriate method should be selected to construct a transmission tree in total consideration of the number, density and distribution of senders and receivers, which is not an easy task.

In other words, problems of interoperation and disagreement between Internet service providers (ISPs) inhibit the provision of multicast service.

Referring to FIG. 1B, an application-layer multicast scheme sets up the transmission order of terminals according to only a unicast transmission scheme of an Internet Protocol (IP) layer, and then transfers data. Thus, the load on the server can be reduced, and traffic can be distributed all over a network in which the terminals are located.

Referring to FIG. 1C, there is a scheme of converting unicast data into multicast data and relaying it. Likewise, this scheme has an advantage in traffic distribution and can improve the time taken for transferring data to the final terminal.

Figure 2:
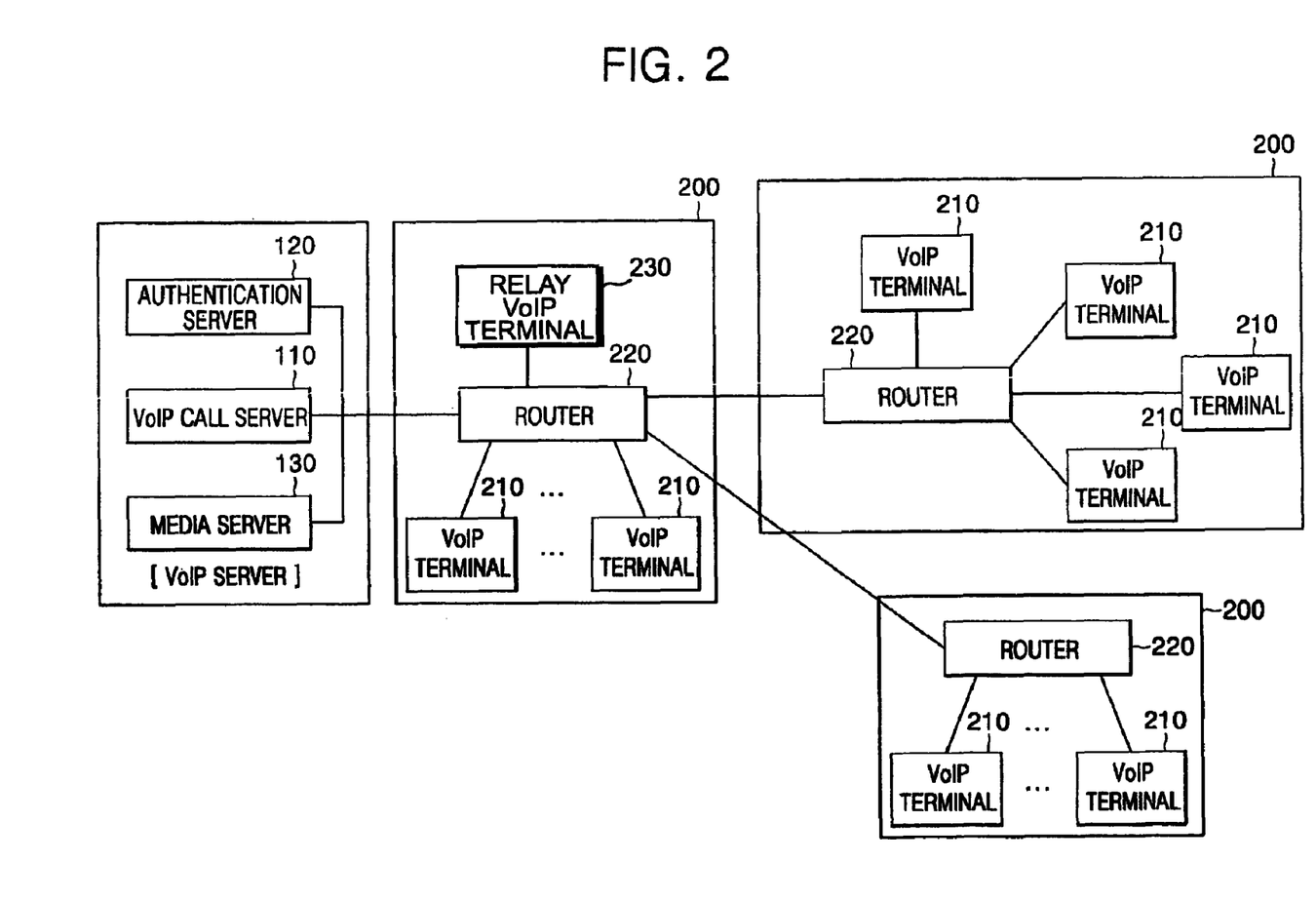
FIG. 2 is a block diagram of a system for processing multicast in a unicast-based Voice over Internet Protocol (VoIP) system according to an exemplary embodiment of the present invention.

FIG. 2 is a block diagram of a system for processing multicast in a unicast-based VoIP system according to an exemplary embodiment of the present invention. The system comprises a VoIP call server 110, an authentication server 120, a media server 130, and at least one subnet 200 comprising at least one VoIP terminal 210.

After the VoIP terminal 210 is authenticated by the authentication server 120, the VoIP call server 110 receives subnet information from the VoIP terminal 210, updates information of a multicast group with the received subnet information, and transmits Internet Protocol (IP) address information of the multicast group to the VoIP terminal 210. Meanwhile, when a relay VoIP terminal 230 of the subnet 200 is selected, the VoIP call server 110 transmits multicast session information to the relay VoIP terminal 230 and requests the media server 130 to transmit group message data to the relay VoIP terminal 230.

Figure 3:
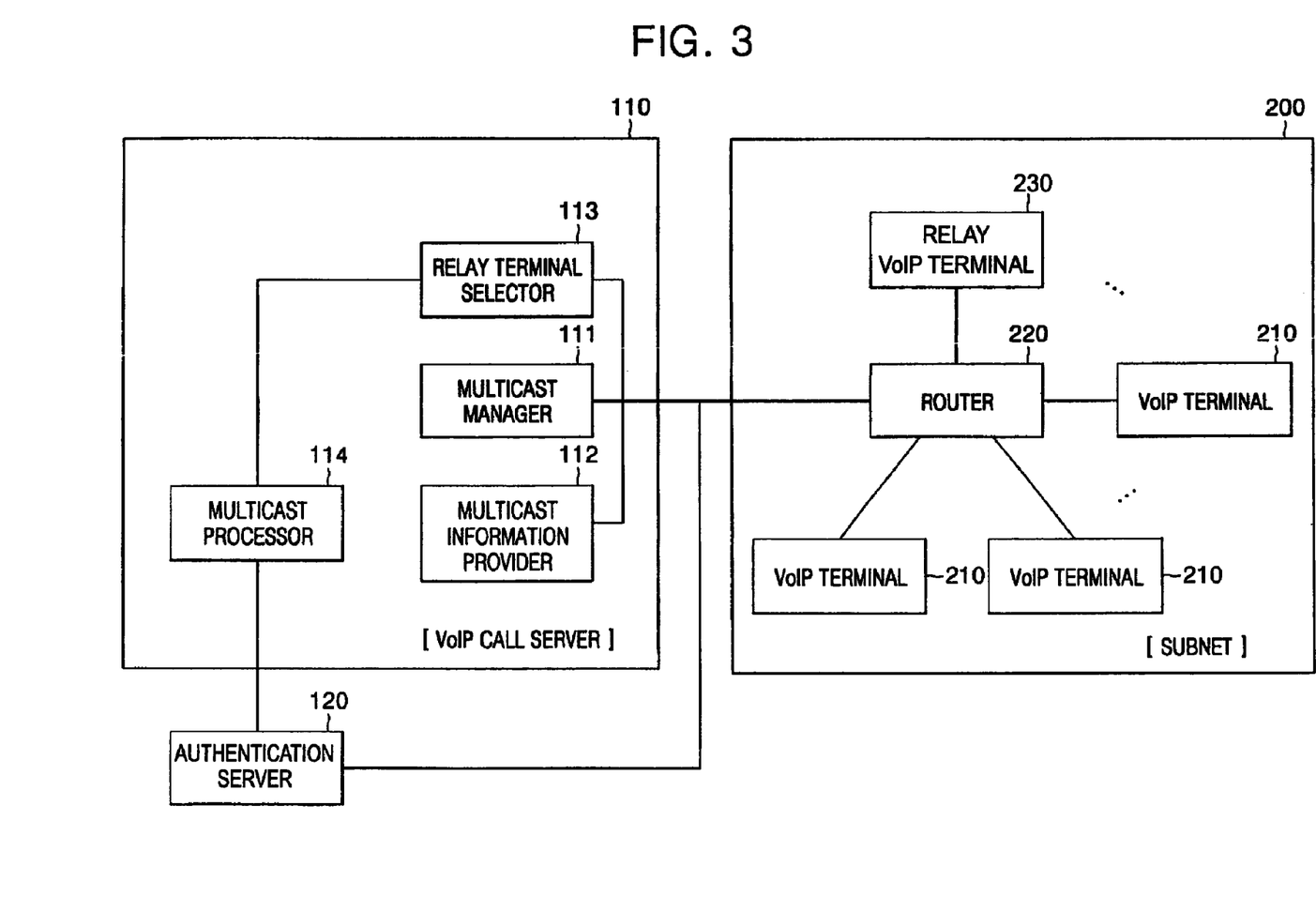
FIG. 3 is a block diagram of a VoIP call server of the system for processing multicast in a unicast-based VoIP system shown in FIG. 2.

FIG. 3 is a block diagram of a VoIP call server of the system for processing multicast in a unicast-based VoIP system shown in FIG. 2.

As illustrated in FIG. 3, the VoIP call server 110 includes a multicast manager 111, a multicast information provider 112, a relay terminal selector 113, and a multicast processor 114. In this regard, the relay VoIP terminal 230 is a VoIP terminal 210 which has received multicast session information from the VoIP call server 110.

The multicast manager 111 of the VoIP call server 110 receives subnet information from the VoIP terminal 210, and updates multicast group information with received subnet information of the VoIP terminal 210. In this regard, the multicast manager 111 manages all of the VoIP terminals 210 using a user database, and groups are formed in a hierarchical tree structure. When information of the VoIP terminal 210 is changed, only the information is modified in the user database and is automatically applied.

The multicast information provider 112 of the VoIP call server 110 transmits updated IP address information of a multicast group to the corresponding VoIP terminal 210.

In addition, the relay terminal selector 113 of the VoIP call server 110 selects the relay VoIP terminal 230 of the subnet 200, and transmits multicast session information to the relay VoIP terminal 230.

The multicast processor 114 of the VoIP call server 110 requests the media server 130 to transmit group message data to the relay VoIP terminal 230.

After being authenticated by the authentication server 120, the VoIP terminal 210 transmits information of a subnet, to which the VoIP terminal 210 itself belongs, to the VoIP call server 110. Meanwhile, when receiving corresponding multicast group information from the VoIP call server 110, the VoIP terminal 210 allocates a corresponding multicast IP address to its own network interface card (NIC), and when receiving multicast session information from the VoIP call server 110, the VoIP terminal 210 changes a unicast IP address of unicast group message data received from the media server 130 to a multicast IP address, and transmits the multicast group message data to the subnet 200.

Figure 4:
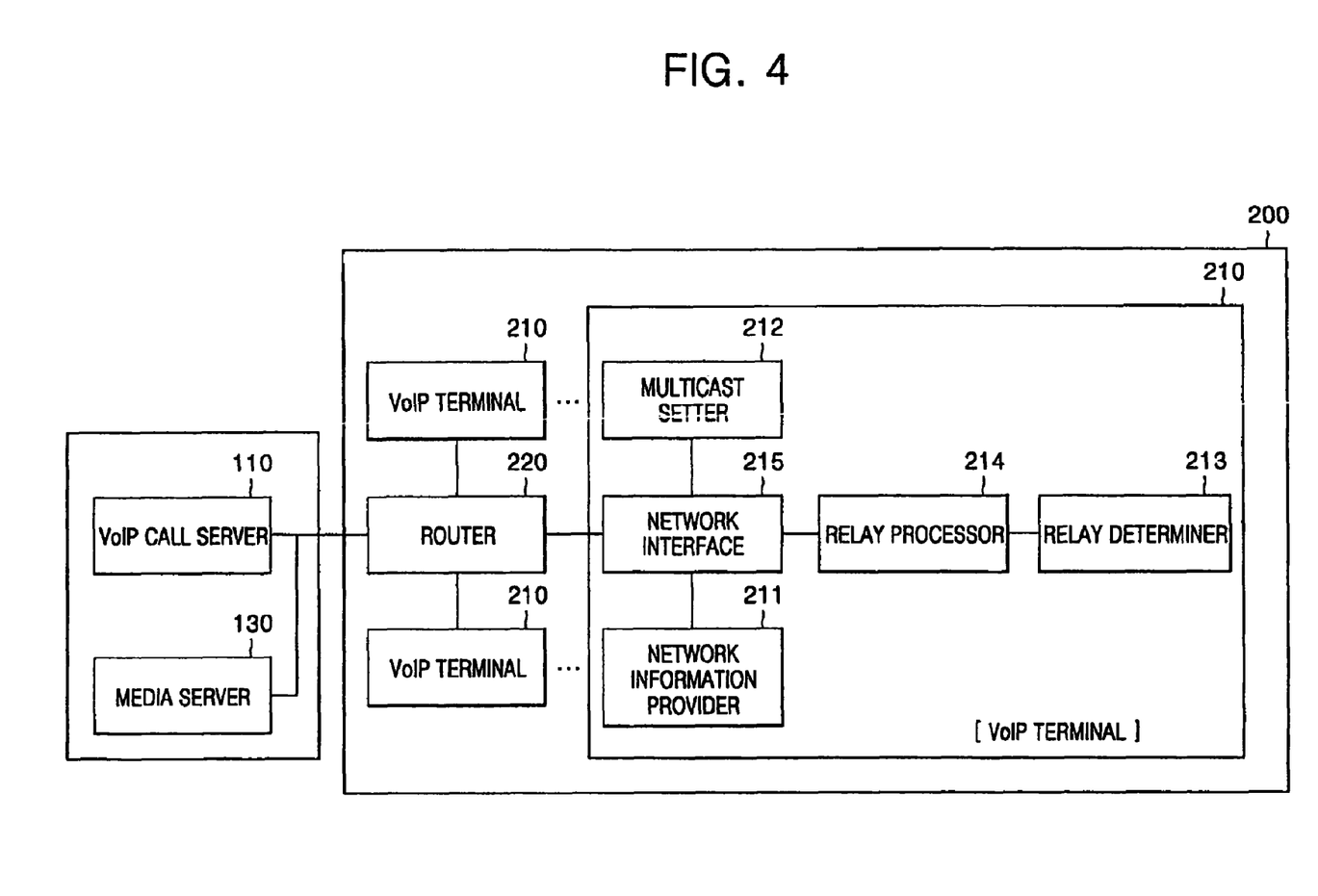
FIG. 4 is a block diagram of a VoIP terminal of the system for processing multicast in a unicast-based VoIP system shown in FIG. 2.
Figure 5:
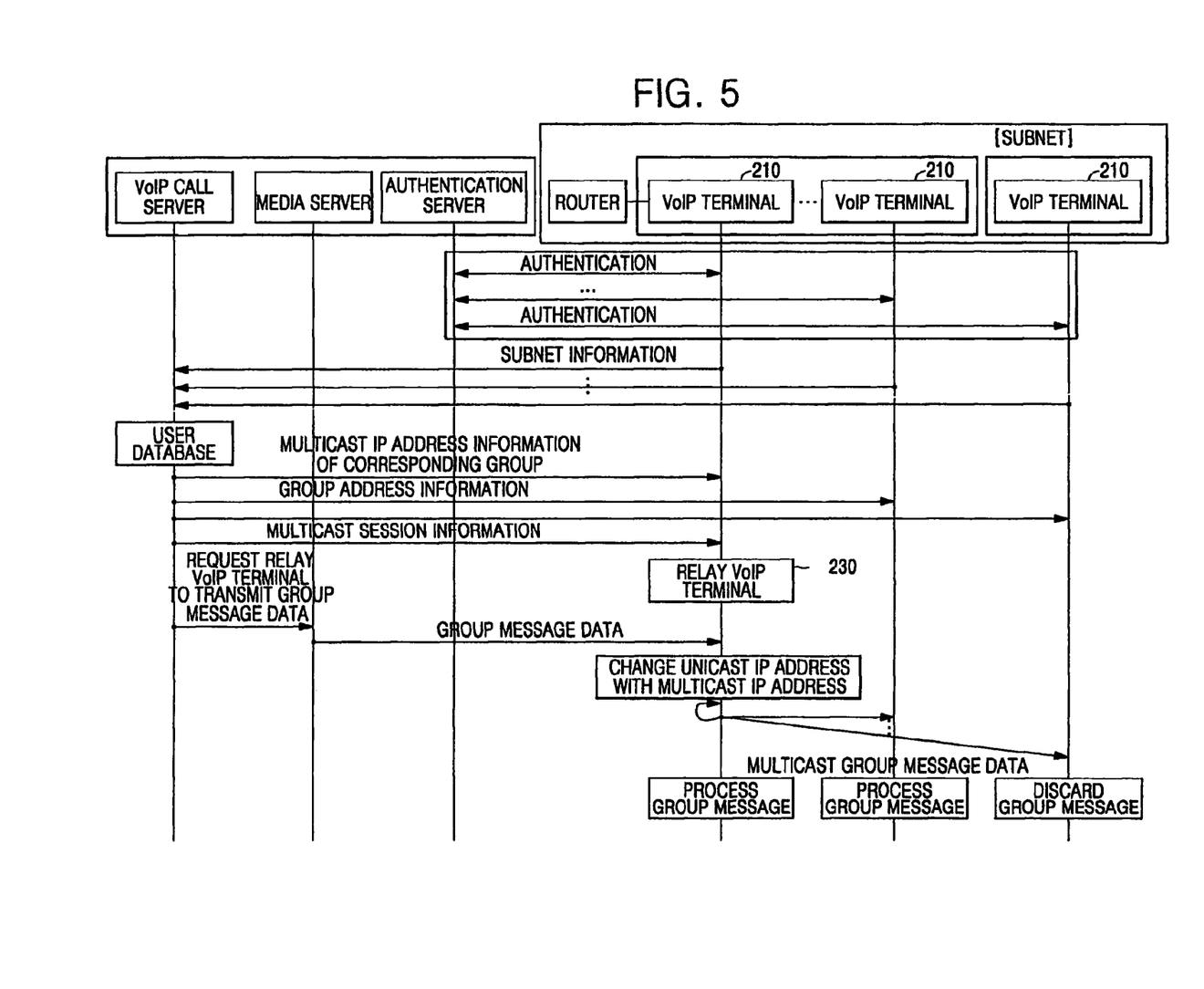
FIG. 5 is a diagram showing the flow of signals processed by the system for processing multicast in a unicast-based VoIP system shown in FIG. 2.

FIG. 4 is a block diagram of a VoIP terminal of the system for processing multicast in a unicast-based VoIP system shown in FIG. 2.

As illustrated in FIG. 4, the VoIP terminal 210 includes a network information provider 211, a multicast setter 212, a relay determiner 213, a relay processor 214, and a network interface 215.

The network information provider 211 of the VoIP terminal 210 transmits its own subnet information to the VoIP call server 110. In this regard, the subnet information further includes a subnet IP address and netmask information.

When receiving multicast group information from the VoIP call server 110, the multicast setter 212 of the VoIP terminal 210 allocates the corresponding multicast IP address to its own network interface 215. Here, the multicast group information includes IP addresses of all multicast groups, including the VoIP terminal 210.

The relay determiner 213 of the VoIP terminal 210 determines whether multicast session information is received from the VoIP call server 110, and thereby determines whether or not to relay group message data. Here, the multicast session information includes a multicast IP address, a data type, and group identification (ID) information.

When receiving unicast group message data from the media server 130, the relay processor 214 of the VoIP terminal 210 changes a unicast IP address to a multicast IP address corresponding to multicast session information, and transmits multicast group message data to its own subnet network 200.

General functions and detailed operations of the above described components will be omitted, but operations relating to the present invention will be mainly described with reference to FIGS. 2 thru 5.

As illustrated in FIG. 2, in general, the VoIP system comprises VoIP call server 110, media server 130, authentication server 120, and at least one subnet 200 including at least one VoIP terminal 210.

The VoIP call server 110 may be an IP-private branch exchange (PBX), a session initiation protocol (SIP) server, an H.323 gatekeeper, etc. according to a support protocol, and may be classified into an enterprise environment type and a home environment, i.e., general user type according to the network environment.

Figure 6:
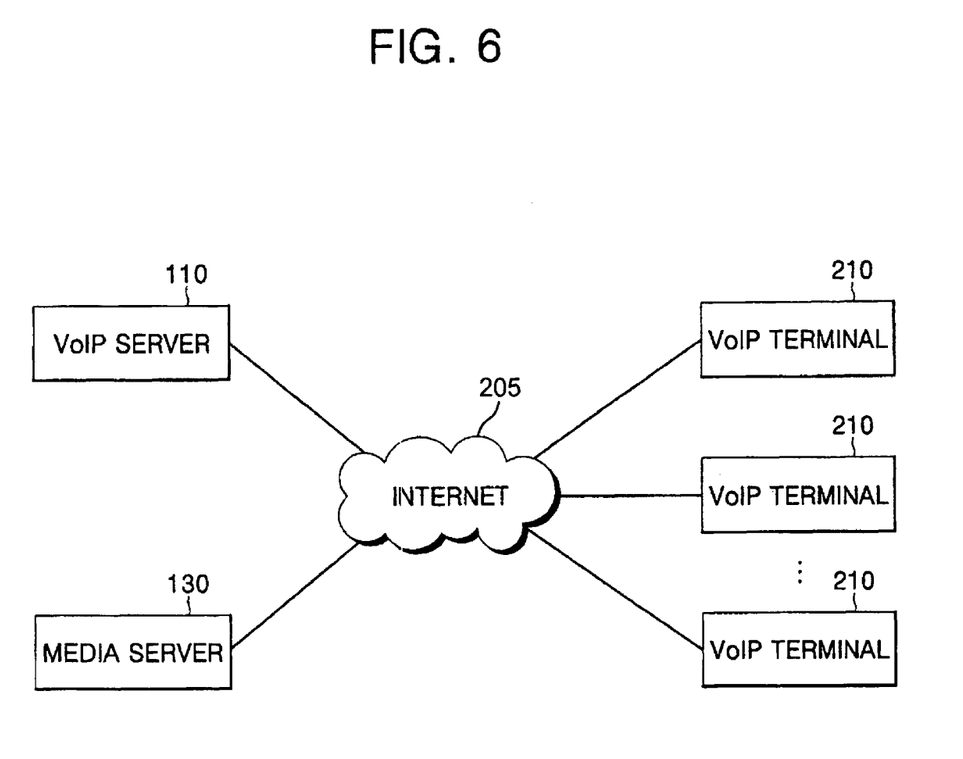
FIG. 6 is a block diagram of a home VoIP system.
Figure 9:
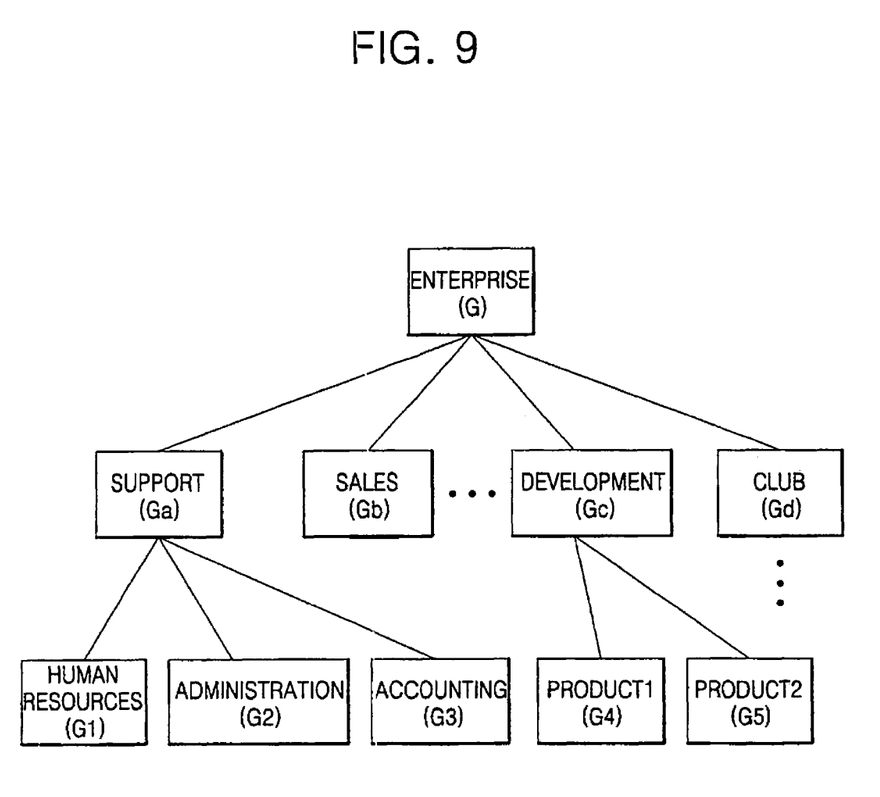
FIG. 9 illustrates a group tree-structure of an enterprise network according to the present invention.

FIG. 6 is a block diagram of a home VoIP system, and FIG. 9 illustrates a group tree-structure of an enterprise network according to the present invention.

In the enterprise network environment, as illustrated in FIGS. 2 and 9, a plurality of VoIP terminals 210 are connected through at least one router 220, and thereby constitute a subnet 200, and the constituted subnet 200 is connected to the VoIP call server 110. On the other hand, in the home network environment, as illustrated in FIG. 6, the VoIP call server 110 is connected to respective VoIP terminals 210 through the Internet 205 without forming the subnet 200.

In the latter regard, the present invention can be applied regardless of the type of the VoIP call server 110. However, since the VoIP terminal 210 relays data for multicast, the structure is influenced by the distribution of users. Therefore, this description will be made based on the assumption of a topology in which a large number of users exist in a region, such as an enterprise network environment, maximizing the effects of the present invention. The enterprise network environment is an environment in which a large number of users exist in a region, such as a general enterprise, a government office, and an apartment complex.

In general, a VoIP system transmits group message data using multicast in order to transfer the same message data to several people. In this regard, all transmissions, such as voice transmissions, which includes corporate announcements, and image and text-based data transmissions of the same content to a large number of receivers, are referred to as a group message service.

Therefore, the VoIP system of the present invention requires the connection of the VoIP terminals 210 to provide group message service.

Thus, the VoIP terminals 210 transmit terminal information, such as their IDs, phone numbers, passwords, etc. to the authentication server 120 of FIG. 3, thereby performing an authentication process.

Subsequently, the VoIP terminal 210 transmits its own subnet information, i.e., a subnet IP and netmask information, to the VoIP call server 110 through the network information provider 211 of FIG. 4.

Then, the multicast manager 111 (FIG. 3) of the VoIP call server 110 checks the subnet information transmitted from the VoIP terminal 210, and constructs a user database. The user database includes information of a subnet to which the VoIP terminal 210 belongs, information of the VoIP terminal 210, and state information.

Subsequently, the multicast information provider 112 of the VoIP call server 110 provides multicast IP address information of a group, including the VoIP terminal 210, to the corresponding VoIP terminal 210.

Then, the multicast setter 212 (FIG. 4) of the VoIP terminal 210 registers the multicast IP address information of the group, received from the VoIP call server 110, in the network interface 215.

Subsequently, the relay terminal selector 113 (FIG. 3) of the VoIP call server 110 checks the user database managed by the multicast manager 111, and selects the relay VoIP terminal 230 (FIG. 2) of the subnet 200. Meanwhile, the relay terminal selector 113 (FIG. 3) retrieves information from subnets to which the VoIP terminals 210 of respective groups belong, and thereby determines whether all the VoIP terminals 210 of a group for transmission exist in the same subnet 200, i.e., local area network (LAN), as the media server 130 (FIG. 2) and a group message-transmission terminal (not shown).

When at least one VoIP terminal 210 exists in the subnet 200, the relay terminal selector 113 (FIG. 3) of the VoIP call server 110 provides multicast session information, including a multicast IP address, a data type, and group ID information, to the selected relay VoIP terminal 230.

The VoIP terminal 210 checks whether the multicast session information is received from the VoIP call server 110 by means of the relay determiner 213 (FIG. 4). When reception of the multicast session information is checked bit the relay determiner 213 of the VoIP terminal 210, the VoIP terminal 210 operates as the relay VoIP terminal 230 (FIG. 3). In this regard, the relay VoIP terminal 230 is the VoIP terminal 210 selected by the VoIP call server 110. The relay VoIP terminal 230 is flexibly selected based on consideration of whether the VoIP terminal 210 is not in use, whether the VoIP terminal 210 is not frequently used, hardware performance, and so forth.

Subsequently, for the sake of transmission of group message data, the VoIP call server 110 requests the multicast processor 114 thereof to transmit the group message data to the selected relay VoIP terminal 230.

Then, the media server 130 (FIG. 4) transmits the group message data to the relay VoIP terminal 230 (FIG. 3) by a unicast scheme.

Subsequently, the relay processor 214 (FIG. 4) of the relay VoIP terminal 210 receiving the group message data from the media server 130 by the unicast scheme changes a unicast IP address of the group message data to a multicast IP address, and then transmits the group message data to the subnet 200 thereof while re-receiving and processing the multicast group message data transmitted by the relay VoIP terminal 230 itself using multicast.

Meanwhile, other VoIP terminals 210 existing in the same subnet 200 as the relay VoIP terminal 230 (FIG. 3) cannot receive the multicast session information from the VoIP call server 110, and thus do not operate as the relay VoIP terminal 230.

Therefore, upon receiving the multicast group message data from the relay VoIP terminal 230, the VoIP terminals 210 receive only multicast group message data having the same IP address as the multicast IP address registered in the network interface 215 (FIG. 4). The network interface 215 of the VoIP terminal 210 performs filtering, not based on a unicast IP address, but based on only a multicast IP address.

Figure 7:
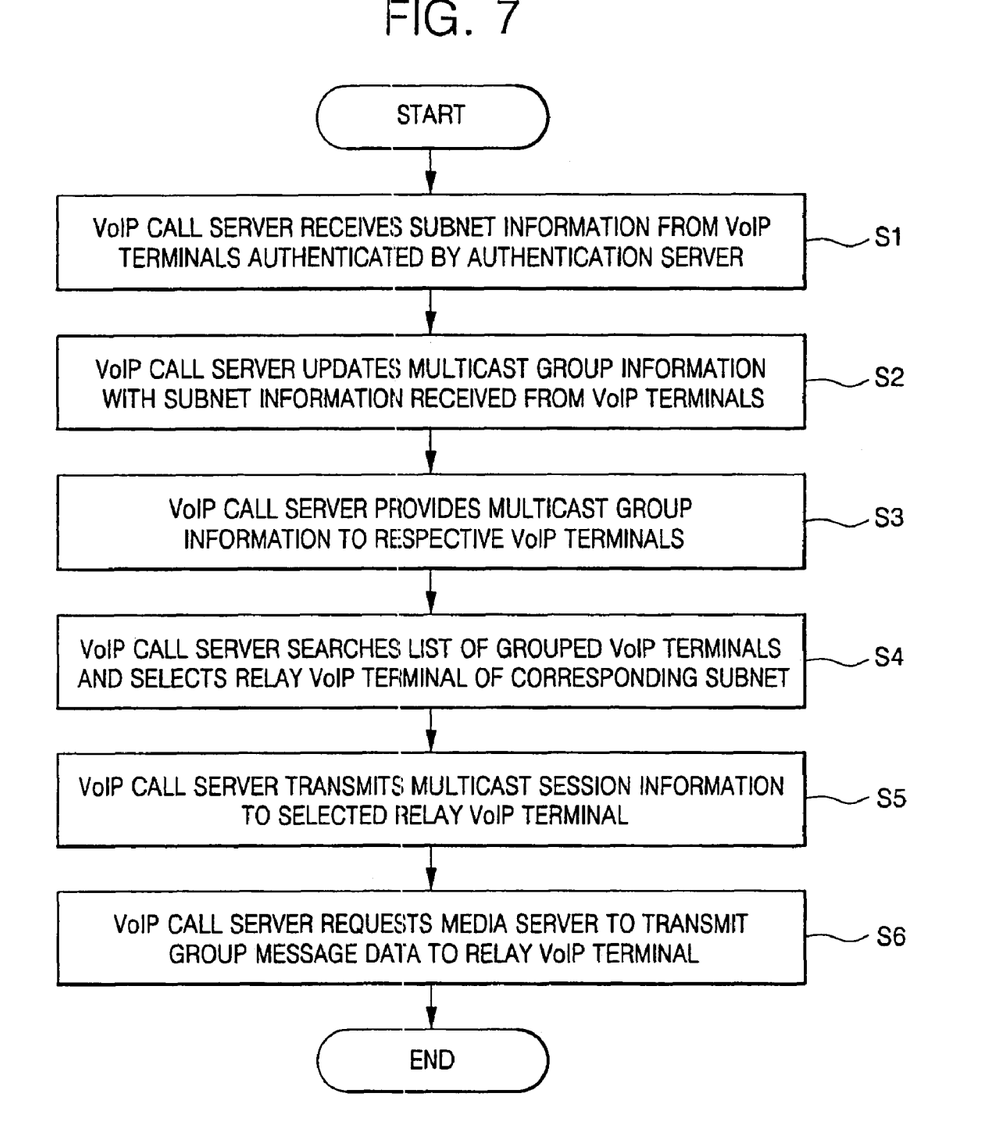
FIG. 7 is a flowchart showing a method of processing multicast in a unicast-based VoIP system according to an exemplary embodiment of the present invention.

FIG. 7 is a flowchart showing a method of processing multicast in a unicast-based VoIP system according to an exemplary embodiment of the present invention. Thus, a method of processing multicast in a unicast-based VoIP system having the above-described constitution according to an exemplary embodiment of the present invention will now be described with reference to FIG. 7.

First, the VoIP call server 110 receives subnet information from a VoIP terminal 210 authenticated by an authentication server 120 (step S1).

Subsequently, the VoIP call server 110 updates multicast group information with the subnet information received from the VoIP terminal 210 (step S2). The subnet information includes a subnet IP address and netmask information.

Subsequently, the VoIP call server 110 provides the multicast group information to the respective VoIP terminals 210 (step S3). The multicast group information includes IP addresses of all multicast groups including the VoIP terminal 210.

Subsequently, the VoIP call server 110 retrieves a list of the grouped VoIP terminals 210, and selects a relay VoIP terminal 230 of a corresponding subnet 200 (step S4).

Then, the VoIP call server 110 transmits multicast session information to the selected relay VoIP terminal 230 (step S5). The multicast session information includes a multicast IP address, a data type, and group ID information.

Subsequently, the VoIP call server 110 requests a media server 130 to transmit group message data to the relay VoIP terminal 230 (step S6).

Figure 8:
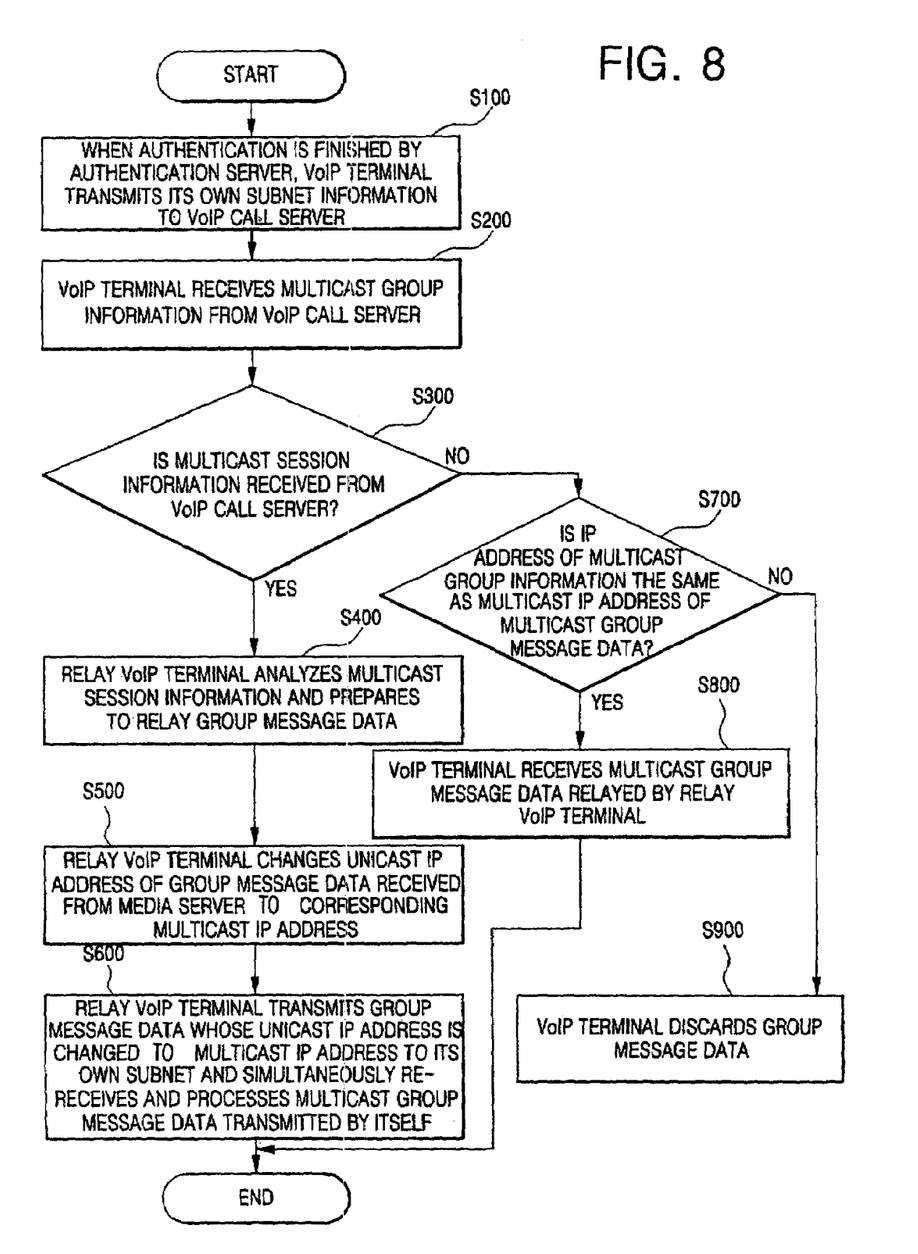
FIG. 8 is a flowchart showing a method of processing multicast in a unicast-based VoIP system according to another exemplary embodiment of the present invention.

FIG. 8 is a flowchart showing a method of processing multicast in a unicast-based VoIP system according to another exemplary embodiment of the present invention. Thus, the method of processing multicast in a unicast-based VoIP system having the above-described constitution according to an exemplary embodiment of the present invention will now be described with reference to FIG. 8.

First, when authentication of a VoIP terminal 120 is finished by an authentication server 120, the VoIP terminal 120 transmits its own subnet information to a VoIP call server 110 (step S100).

Subsequently, the VoIP terminal 210 receives multicast group information from the VoIP call server 110 (step S200).

Then, the VoIP terminal 210 determines whether or not multicast session information is received from the VoIP call server 110 (step S300).

When it is determined, in step S300, that multicast session information is received from the VoIP call server 110 (YES), the VoIP terminal 210 analyzes the multicast session information and prepares to relay group message data (step S400).

Subsequently, when receiving the group message data from a media server 130 via unicast, the VoIP terminal 210 changes a unicast IP address of the group message data to the corresponding multicast IP address (step S500).

Subsequently, the VoIP terminal 210 transmits the group message data, the unicast IP address of which is changed to the multicast IP address, to its own subnet 200, and simultaneously re-receives and processes the multicast group message data transmitted by the VoIP terminal 210 itself using multicast (step S600).

On the other hand, when it is determined in step S300 that multicast session information is not received from the VoIP call server 110 (NO), the VoIP terminal 210 compares an IP address of the multicast group information received from the VoIP call server 110 to a multicast IP of multicast group message data received from a relay VoIP terminal 230, and determines whether the two IP addresses are identical (step S700).

When it is determined, in step S700, that the IP address of the multicast group information received from the VoIP call server 110 is the same as the multicast IP address of the multicast group message data received from the relay VoIP terminal 230 (YES), the VoIP terminal 210 receives the multicast group message data relayed by the relay VoIP terminal 230 (step S800).

On the other hand, when it is determined in step S700 that the IP address of the multicast group information received from the VoIP call server 110 is not the same as the multicast IP address of the multicast group message data received from the relay VoIP terminal 230 (NO), the VoIP terminal 210 discards the group message data (step S900).

According to the inventive method and system for processing multicast in a unicast-based VoIP system, it is possible to implement multicast in a unicast-based VoIP system without additional equipment.

In addition, since a VoIP terminal does not need to have group information, a troublesome procedure whereby a user configures additional information in the VoIP terminal can be omitted, thereby preventing side effects caused by the user's input error. Also, for the same reason, the time taken for registration is reduced.

When transmitting a group message, a VoIP call server checks respective VoIP terminals and selects a relay terminal. Therefore, in contrast to a method using a fixed relay VoIP terminal, it is possible to prevent service from being unavailable due to concentration of loads or an unexpected error of a VoIP terminal.

A VoIP call server sets up and maintains group information to have the same structure as the hierarchical structure of a conventional organization, and thus it is possible to perform group management together with user management.

In addition, when efficiency of a network is seen from the viewpoint of cost, a method of simply changing an address of data to a multicast address and relaying the data is comparable to the present invention. Here, respective transmission efficiencies can be quantitatively calculated.

Figure 10:
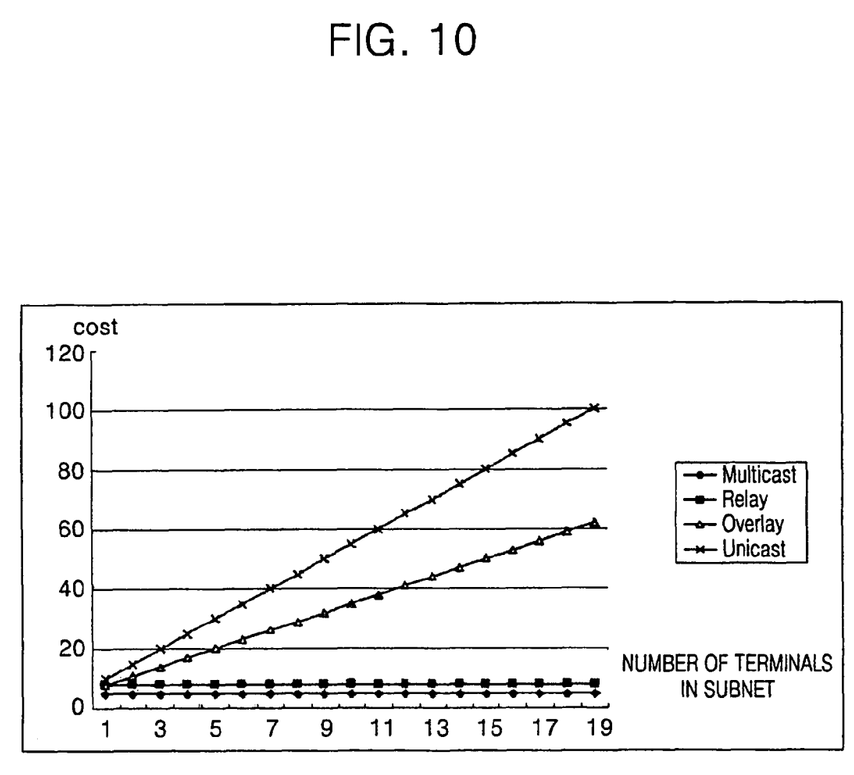
FIG. 10 is a graph comparing the amount of network resources required by the present invention to the amount of network resources required by conventional methods.

Referring to the formulas set forth below, Formula 1 shows transmission efficiency obtained by using a multicast transmission scheme in a network, Formula 2 shows transmission efficiency obtained by using a unicast transmission scheme in a network, Formula 3 shows transmission efficiency obtained by using an application-layer multicast transmission scheme in a network, and Formula 4 shows transmission efficiency obtained by using the multicast transmission scheme involving terminal relay in a network.

Performance of the respective transmission schemes can be seen in the graph of FIG. 10, which is a graph comparing the amount of network resources required by the present invention to the amount of network resources required by conventional methods. In FIG. 10, the y-axis indicates cost, and the x-axis indicates the number of terminals in each subnet. As can be seen from FIG. 10, the multicast transmission scheme and the multicast transmission scheme involving terminal relay are not influenced by an increment of the number of terminals existing in each subnet.

$$C_m = \overset{n}{\underset{i=0}{Q}} c_i - c_{pass} \quad \text{Formula 1}$$

$C_m$: cost required for transmitting a message using the multicast scheme
$C_i$: cost to an i-th subnet
$C_{pass}$: number of times that transmission paths overlap each other $$C_u = \overset{n}{\underset{i=0}{Q}} (c_i sh_1) \quad \text{Formula 2}$$

$C_u$: cost required for transmitting a message using the unicast scheme
$h_i$: number of receiving terminals existing in the i-th subnet $$C_a = \overset{n}{\underset{i=0}{Q}} (c_i + h_i - 1) \quad \text{Formula 3}$$

$C_a$: cost required for transmitting a message using the application-layer multicast scheme
$C_i$: cost to the i-th subnet
$h_i$: number of receiving terminals existing in the i-th subnet $$C_r = \overset{n}{\underset{i=0}{Q}} (c_i + b_i) \quad \text{Formula 4}$$

$C_r$: cost required for transmitting a message using the multicast relay scheme
$b_i$: equals 0 when one terminal exists in the i-th subnet, and equals 1 when two or more terminals exist While the present invention has been described with reference to exemplary embodiments thereof, it will be understood by those skilled in the art that various changes in from and detail may be made therein without departing from the scope of the present invention as defined by the following claims

What is claimed is:

1. A method of processing multicast in a unicast-based Voice over Internet Protocol (VoIP) system, the method comprising the steps of:
   receiving, at a VoIP call server, subnet information from VoIP terminals authenticated by an authentication server, generating multicast group information, and then providing the multicast group information to respective authenticated VoIP terminals;

searching, at the VoIP call server, a list of grouped VoIP terminals, selecting a VoIP terminal of a corresponding subnet, and then transmitting multicast session information to the selected VoIP terminal so as to set the selected VoIP terminal as a relay VoIP terminal; and requesting, at the VoIP call server, a media server to transmit group message data to the relay VoIP terminal.

2. The method of claim 1, wherein the subnet information comprises a subnet Internet Protocol (IP) address.

3. The method of claim 2, wherein the subnet information further comprises netmask information.

4. The method of claim 1, wherein the multicast group information comprises Internet Protocol (IP) addresses of all multicast groups including the selected VoIP terminal.

5. The method of claim 1, wherein the multicast session information comprises a multicast Internet Protocol (IP) address, a data type, and group identification (ID) information.

6. A method of processing multicast in a unicast-based Voice over Internet Protocol (VoIP) system, the method comprising the steps of:

(a) when authentication of a VoIP terminal is completed by an authentication server, transmitting, at the VoIP terminal, subnet information to a VoIP call server;

(b) receiving, at the VoIP terminal, multicast group information from the VoIP call server;

(c) determining, at the VoIP terminal, whether multicast session information is received from the VoIP call server;

(d) when it is determined, in step (c), that the multicast session information is received, analyzing, at the VoIP terminal, the multicast session information and preparing to relay group message data;

(e) when the VoIP terminal receives group message data from a media server via unicast, changing, at the VoIP terminal, a unicast Internet Protocol (IP) address to a corresponding multicast IP address; and (f) transmitting, at the VoIP terminal, the group message data, the unicast IP address of which is changed to the multicast IP address, to a subnet of the VoIP terminal, and simultaneously re-receiving and processing the multicast group message data transmitted by the VoIP terminal itself using multicast.

7. The method of claim 6, further comprising the steps of:

when it is determined, in step (c), that the multicast session information is not received, comparing, at the VoIP terminal, an IP address of the multicast group information received from the VoIP call server to a multicast IP address of multicast group message data received from a relay VoIP terminal, and determining whether the IP address of the multicast group information received from the VoIP server is the same as the multicast IP address of the multicast group message data received from the relay VoIP terminal; and when it is determined, in the step of determining whether the IP address of the multicast group information received from the VoIP call server is the same as the multicast IP address of the multicast group message data received from the relay VoIP terminal, that the IP address of the multicast group information received from the VoIP server is the same as the multicast IP address of the multicast group message data received from the relay VoIP terminal, receiving, at the VoIP terminal, multicast group message data relayed by the relay VoIP terminal.

8. A system for processing multicast in a unicast-based Voice over Internet Protocol (VoIP) system, the system comprising:

a VoIP call server responsive to a VoIP terminal being authenticated by an authentication server for receiving subnet information from the VoIP terminal, for updating information of a multicast group with the received subnet information, and for transmitting Internet Protocol (IP) address information of the multicast group to the VoIP terminal, and responsive to a relay VoIP terminal of a subnet being selected for transmitting multicast session information to the relay VoIP terminal, and for requesting a media server to transmit group message data to the relay VoIP terminal; and a VoIP terminal responsive to being authenticated by the authentication server for transmitting information of a subnet to which the VoIP terminal belongs to the VoIP call server for allocating a corresponding multicast IP address to a network interface of the VoIP terminal itself when receiving corresponding multicast group information from the VoIP call server, for changing a unicast IP address of unicast group message data received from the media server to a multicast IP address, and for transmitting the multicast group message data to the subnet when receiving multicast session information from the VoIP call server.

9. The system of claim 8, wherein the VoIP call server comprises:

a multicast manager for receiving the subnet information from the VoIP terminal, and for updating the multicast group information with the received subnet information of the VoIP terminal;

a multicast information provider for transmitting the updated IP address information of the multicast group to the VoIP terminal;

a relay terminal selector for selecting the relay VoIP terminal of the subnet, and for transmitting the multicast session information to the relay VoIP terminal; and a multicast processor for requesting the media server to transmit the group message data to the relay VoIP terminal.

10. The system of claim 8, wherein the VoIP terminal comprises:

a network information provider for transmitting its own subnet information to the VoIP call server;

a multicast setter for allocating the multicast IP address to its own network interface when receiving the multicast group information from the VoIP call server;

a relay determiner for determining whether multicast session information is received from the VoIP call server, and for determining whether to relay the group message data; and a relay processor which, upon receiving the unicast group message data from the media server, changes the unicast IP address to the multicast IP address corresponding to the multicast session information, and transmits the multicast group message data to its own subnet.

11. The system of claim 10, wherein the VoIP terminal further comprises: a multicast media processor which, when multicast session information is not received from the VoIP call server, determines whether the multicast group message data is received from the relay VoIP terminal, and receives only corresponding multicast group message data.

12. The system of claim 8, wherein the subnet information comprises a subnet IP address.

13. The system of claim 12, wherein the subnet information further comprises netmask information.

14. The system of claim 8, wherein the multicast group information comprises IP addresses of all multicast groups including the VoIP terminal.

15. The system of claim 8, wherein the multicast session information comprises a multicast IP address, a data type, and group identification (ID) information.

* * * * *